Jan. 4, 1944.   B. D. MAULE   2,338,294
TIRED WHEEL
Filed April 7, 1941

Inventor
BELFORD D. MAULE
By Beaman & Langford
Attorneys

Patented Jan. 4, 1944

2,338,294

UNITED STATES PATENT OFFICE 2,338,294

TIRED WHEEL

Belford D. Maule, Michigan Center, Mich.

Application April 7, 1941, Serial No. 387,139

6 Claims. (Cl. 152—248)

The present invention relates to wheels having solid rubber tires cemented thereto, and more particularly to wheels particularly adaptable for use as tail wheels for airplanes.

Tail wheels for airplanes are usually provided with pneumatic tires. Pneumatic tires and wheels therefor, as units are expensive and are not necessary to give the required cushioning for the tails of light airplanes. The present invention contemplates the provision of a sheet metal shell, having molded thereover a solid rubber tire. The construction thus obtained is not only lighter in weight than conventional wheels and pneumatic tires, but also is less expensive to manufacture. While the invention is particularly adaptable to tail wheels for airplanes, it is not considered an essential feature of the invention that wheels embodying the invention be applicable to airplane tail wheels only.

An object of the invention is to provide a wheel having a hollow shell and a molded tire secured thereto.

Another object of the invention is to provide a hollow shell composed of two sheet metal stampings butted together and provided with a solid rubber tire.

Still another object of the invention is to provide a tire support of hollow sheet metal having a molded tire secured thereto.

Figures 1, 2:
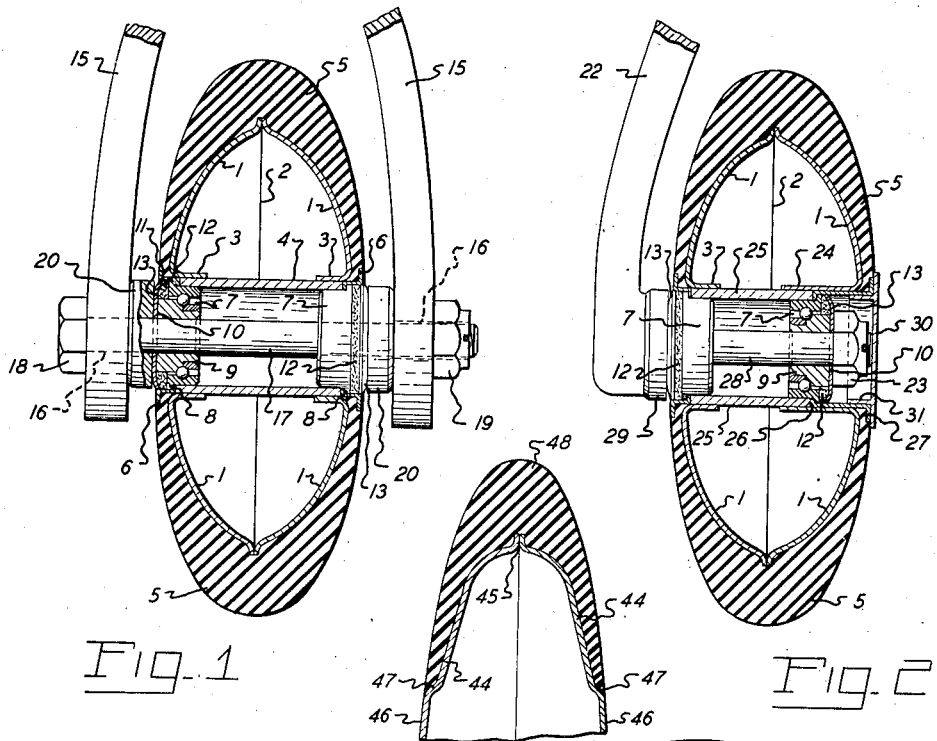
Figure 5:
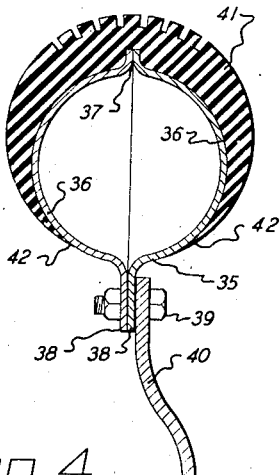
Figures 3, 4:
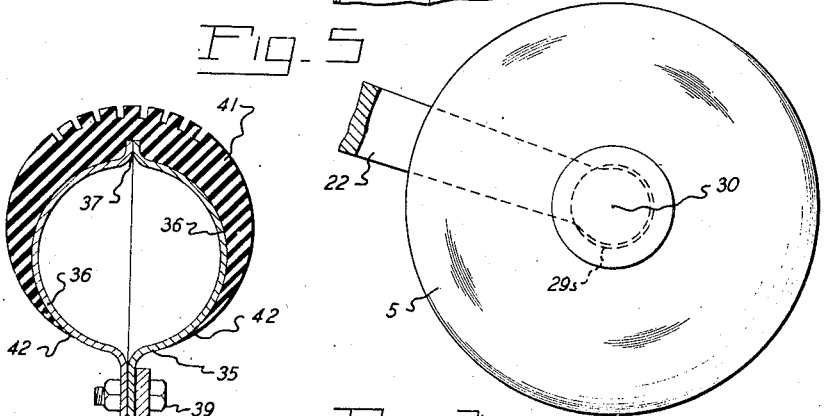

These and other objects residing in the arrangement, combination and construction of the parts will be apparent from the following specification when taken with the accompanying drawing, in which Fig. 1 is a vertical section of a wheel according to the present invention adapted for support between two forks, Fig. 2 is a vertical section corresponding to Fig. 1, showing an embodiment of the invention wherein the wheel is adapted for mounting from a single arm, Fig. 3 is a side view of a wheel supported as illustrated in Fig. 2, Fig. 4 is a vertical section of a portion of another wheel showing another form that the invention may take, and Fig. 5 is a partial vertical section of still another form of the invention.

Referring particularly to drawing, the reference characters 1 indicate shells in the form of dished sheet metal stampings having the concave sides thereof facing each other and being welded together at their peripheries 2 to provide a wheel body. At the center of each stamping 1 there is drawn a cylindrical portion 3. The cylindrical portions 3 telescopically receive a hub 4, which is in the form of a cylinder and which is suitably secured to the cylindrical portions 3 as by welding. The outer ends of the hub 4 should be spaced somewhat inwardly of the side faces of the shells 1, as shown.

When the shells 1 have been welded together and the hub 4 secured therein, a tire 5 of rubber or other suitable material is molded on the outside of the assembly. In the molding operation a bond between the material of the tire 5 and the shells 1 should be provided. The bond may be made in any suitable way known to those skilled in the art, but usually is accomplished by the use of a cement. As shown, at the periphery of the assembly the tire 5 should be of substantial thickness, while at the sides the tire 5 is relatively thin. As an example in one size of wheel 6⅜" in overall diameter, the thickness of the tire at the periphery is about ¾", while the thickness of the tire adjacent the hub opening is about $\frac{3}{16}$ of an inch.

The body formed by the shells 1 is roughly elliptical in cross section, and the tire 5 is more truly elliptical in cross section to provide a wheel having substantially the configuration of an oblate spheroid. One of the particular advantages of a wheel and tire assembly constructed and shaped as described resides in the fact that the thickness of the tire 5 at the periphery permits the material of the tire to flex outwardly upon a load being placed on the wheel without concentrating a stress tending to separate the tire from the wheel body. This stress is substantially generally distributed along almost the entire outside surface of the wheel body. For example, should the wheel body, consisting of the shells 1, have a peripheral configuration substantially cylindrical, rather than substantially elliptical as disclosed, a load on the wheel would bulge the tire material outwardly in a direction substantially parallel to the wheel axis. This outward bulging is due to the fact that the rubber does not compress, but flows in response to a load placed thereon. As the rubber flows substantially axially when a load is placed on a wheel having a body with a cylindrical periphery, there is a stress tending to separate the tire from the wheel, concentrated at the intersection between the periphery of the wheel body and the sides thereof. Once the bond between the tires and the wheel body is broken, the periodic flexing during use will continue the break in the bond and soon entirely separate the tire from the wheel body. As pointed out above, the substantially elliptical cross section of the applicant's construction minimizes the concentration of bond separation stress, and therefore minimizes the likelihood of bond separation. While the relative shapes of the tire 5 and the wheel body comprised by the shells 1 have the structural advantages above pointed out, as far as their internal strength is concerned, the wheel according to the present invention also is highly advantageous due to the fact that it is streamlined, thereby offering a minimum resistance to the air while in use. A still further advantage in having a wheel as disclosed resides in the fact that there are no exposed pockets or concavities in which mud may collect to hinder the free rotation of the wheel in use. It will be appreciated that mud dried on a wheel or frozen on a wheel, bearing against wheel supporting arms, can completely lock the wheel against rotation so that a plane on which the wheel is carried, upon landing will drag the wheel and then destroy the tire, or at least badly damage the same.

When the wheel body, according to the present invention, has received its tire 5, stepped sheet metal inserts 6 are disposed in each side thereof seating against the ends of the hub 4, and covering the edges of the tire 5 at the hub opening. Ball bearing assemblies 7 provided with radially projecting flanges 8 are inserted in the hubs 4 with the flanges 8 bearing against the shoulders of the inserts 6 seating against the ends of the hub 4. Each of the ball bearing assemblies 7 is provided with an inner race 9, having an outwardly projecting portion 10, each having the end thereof substantially in alignment with a side face of the tire 5. The projecting portions 10 of the inner races 9 provide with the inserts 6 annular recesses 11, in which are disposed felt, grease sealing rings 12. Over the outside of each grease sealing ring 12 is disposed a dished retaining washer 13 therefor.

The wheel disclosed in Fig. 1 is supported by suitable conventional forks 15, supported from the tail of an airplane in any usual manner. Projecting through bores 16 in the forks 15 is a bolt 17 having a head 18 and a clamping nut 19. Spacing the forks 15 from the sides of the wheel are washers 20.

In order to secure the wheel to the forks 15, the bolt 17 is passed through the forks 15, the washers 20 and the inner races 9 of the bearing assemblies 7. The bolt 17 should be substantially the same diameter as the internal diameter of the inner races 9 so as to provide a snug fit. The nut 19 of the bolt 17 is then tightened on the bolt 17 to clamp the parts together, the forks 15 clamping through the washers 20 and the washers 13 against the projecting ends 10 of the inner races 9.

Another form of the invention is disclosed in Fig. 2 wherein the wheel is supported by a single fork 22, rather than by the pair of forks 15. In the form of the invention disclosed in Fig. 2, the wheel is substantially identical in construction with the exception that one of the ball bearing assemblies 7 is supported inwardly of the wheel so as to permit the covering of the clamping nut 23. One of the dished shells 1 of sheet metal is the same as the corresponding part disclosed in Fig. 1. The other shell 1 is provided with an elongated drawn tubular portion 24. The hub 25 telescoped in the tubular portions 3 and 24 is somewhat shorter than the hub 4 of Fig. 1, providing an end portion 26 substantially within the wheel body. Seated on the end portion 26 is a stepped sheet metal annular insert 27 corresponding to one of the inserts 6 of Fig. 1. Seated on the shoulder of the insert 27 against the end portion 26 is a ball bearing assembly 7, which is provided with a grease seal 12, and a covering washer 13 therefor. If desired the insert 27 may be omitted and the bearing flange 8 seated directly on the end portion 26.

The arm 22 is provided with an axle 28 press fitted therein in some suitable manner, and is provided with an integral projection 29 corresponding to one of the washers 20 as disclosed in Fig. 1. The wheel body is passed over the axle 28 and the nut 23 is threaded on to the end thereof to clamp the projection 29 through the grease seal closing washers 13 against the projecting ends 10 of the inner races 9 of the ball bearing assemblies 7. In order to cover the side of the wheel at the hub opening opposite the arm 22, there is provided a hub cap 30 having an annular flange 31 which may be frictionally secured within the stepped insert 27. In the event the insert 27 is omitted, the flange may telescope into the tubular portion 24.

Another form of the invention is disclosed in Fig. 4 wherein the wheel body is replaced by a tire support 35 consisting of two annular sheet metal shells 36, having concave faces, butted together and welded at their peripheries 37. The shells 36 have inner radially extending flanges 38 by means of which the tire supporting body 35 may be suitably secured as by bolts 39 to a wheel 40.

The tire supporting body 35 is provided with a tire 41 of molded resilient material such as rubber, which is applied to the tire supporting body 35 in the same manner that the tire 5 of the constructions of Figs. 1 and 2 is secured to the wheel bodies disclosed therein. One difference between the construction disclosed in Fig. 4 and that disclosed in Figs. 1 and 2 resides in the fact that the tire 41 does not extend completely over the tire supporting body 35, but terminates at each side thereof at point 42. The tire and wheel assembly disclosed in Fig. 4 may have particular use for certain types of trucks, tractors, and the like.

Still another form that the invention may take is disclosed in Fig. 5. In said form of the invention the wheel body consists of concave shells 44 butted together and welded along the intersecting line 45. In this form of the invention the shells 44 adjacent the hub portions thereof are provided with outstanding portions 46 to provide shoulders 47. A tire 48 is molded on the shells 44 and terminates at the shoulders 47. Thus, the construction of Fig. 5 is somewhat similar to that of Fig. 4 in that the tire does not extend completely over the side portions of the wheel body. It will be understood that the wheel body disclosed in Fig. 5 may be provided with the hub structure disclosed in either Figs. 1 or 2.

While the invention has been described only in relation to four forms which it may take, it will be apparent that the invention may take numerous other forms. Also wheels according to the present invention may find application not only in the instances specified, but whenever wheels may be used. One departure that may be made from the specified forms of the invention which have been disclosed is that instead of welding the dished stampings together, they may be brazed or otherwise secured together. Also, in the structure of Fig. 1, the end of the bolt 17 to which the nut 19 is screwed may be threaded into the arm 15 adjacent the nut 19 so as to permit the nut 19 to be taken up against its adjacent arm for locking purposes. Accordingly, I do not wish to be limited except by the scope of the following claims.

I claim:

1. A wheel of the character described comprising a hollow tubular, sheet metal body substantially in the form of an oblate spheroid, a hub for said body, bearing receiving means in said hub, and a covering disposed over and secured to the sides and periphery of said body, said covering being thicker at the periphery of said body than at the sides thereof to provide a tread portion, said covering being shaped and arranged to provide with said body a unitary wheel and tire assembly substantially in the form of an oblate spheroid.

2. In a wheel of the character described, a hollow tubular, sheet metal body substantially in the form of an oblate spheroid, a hub for said body, a bearing means in said hub, and a tire secured to the periphery of said body, said tire being shaped so as to cover the sides of said body as well as the periphery thereof, so as to provide a wheel and tire assembly in the form of an oblate spheroid.

3. In a wheel of the character described, a pair of dished annular members, means for securing said members together at the peripheries thereof to provide a hollow body, an annular ring extending laterally inwardly from the inner periphery of each of said members, a cylindrical member in telescopic relation with said annular rings and secured thereto, the ends of said cylindrical member being disposed inwardly on the sides of said hollow body to provide annular seats for receiving wheel bearing structures.

4. In a wheel of the character described, a pair of dished annular members, means for securing said members together to provide a hollow body, a tire covering the periphery of said body and the sides thereof, a cylindrical member extending through the center of said body to provide a hub, the ends of said cylindrical member being disposed inwardly of the sides of said hollow body to provide annular seats, and sheet metal inserts seating on said seats and overlapping said tire at the sides of the wheel, said inserts being adapted to receive wheel bearing members.

5. The invention as defined in claim 4 wherein one of said annular seats is disposed within the body of the wheel a substantial distance and a hub cap is secured to the wheel to cover the hub opening.

6. A wheel of the character described comprising a hollow sheet metal tubular body, a hub for said body, bearing means in said hub, and a tread secured to the periphery of said body, said tread covering the sides as well as the periphery of said body.

BELFORD D. MAULE.